United States Patent [19]

Mark

[11] Patent Number: 4,506,064

[45] Date of Patent: Mar. 19, 1985

[54] AMIDE AND CARBAMATE TERMINATED COPOLYESTER-CARBONATES

[75] Inventor: Victor Mark, Evansville, Ind.

[73] Assignee: General Electric Company, Mt. Vernon, Ind.

[21] Appl. No.: 550,382

[22] Filed: Nov. 10, 1983

[51] Int. Cl.³ .................................................. C08G 63/64
[52] U.S. Cl. ........................................ 528/176; 528/125; 528/126; 528/128; 528/173; 528/182; 528/193; 528/194
[58] Field of Search ............... 528/125, 126, 128, 173, 528/176, 182, 193, 194

[56] References Cited

U.S. PATENT DOCUMENTS

| | | | |
|---|---|---|---|
| 3,233,678 | 12/1965 | Bolgiano | 528/196 |
| 3,275,601 | 9/1966 | Schnell et al. | 528/196 |
| 4,001,184 | 1/1977 | Scott | 528/196 |
| 4,111,910 | 9/1978 | Baggett | 528/196 |
| 4,219,635 | 8/1980 | Cooke et al. | 528/182 |
| 4,262,110 | 4/1981 | Mark | 528/182 |
| 4,395,534 | 7/1983 | Shimizu et al. | 528/125 |

FOREIGN PATENT DOCUMENTS 0098580  4/1975  Japan .................................. 528/182

Primary Examiner—Lester L. Lee
Attorney, Agent, or Firm—Myron B. Kapustij; Martin B. Barancik

[57] ABSTRACT

Copolyester-carbonates having amide and carbamate terminal groups. These copolyester-carbonates are prepared by reacting (i) a carbonate precursor, (ii) at least one difunctional carboxylic acid or an ester forming reactive derivative thereof, (iii) at least one dihydric phenol, and (iv) a chain terminating amount of at least one carbamate-amide precursor. These copolyester-carbonates exhibit improved thermal stability.

12 Claims, No Drawings

AMIDE AND CARBAMATE TERMINATED COPOLYESTER-CARBONATES

BACKGROUND OF THE INVENTION

The importance of chain terminating or end-capping copolyester-carbonate resins by means of certain molecular weight regulating or chain terminating compounds is well known in the art. Copolyester-carbonates which are not end-capped or chain terminated are generally insufficiently heat stable. Furthermore, the absence of chain terminating or end capping agents or conditions during the preparation of the aromatic copolyester-carbonates results in polymers with a molecular weight which is often so high that the polymers are too viscous to mold at reasonable temperatures.

Standard chain terminating agents employed in the preparation of copolyester-carbonate resins include members of the phenol family such as phenol itself and tertiarybutyl phenol. While these phenol chain terminating agents are generally effective, there is a need, in certain applications, for copolyester-carbonate resins exhibiting higher terminal stabilities than those exhibited by conventional copolyester-carbonates employing phenols as end capping agents. It is known that replacing these phenol end capping agents by benzoate esters yields copolyester-carbonates exhibiting improved heat resistances.

However, the field of chain terminators and their effects upon the properties of copolyester-carbonates is generally not completely understood and is one wherein the empirical approach is generally the rule rather than the exception in determining whether a particular compound or class of compounds will function effectively as chain terminators. Thus, for example, while a particular compound may function effectively as a chain terminator another similar compound may be ineffective as a chain terminator. This area is further complicated by the fact that not only must a particular compound function as a chain terminator, but this compound when incorporated into the copolyester-carbonate polymer as a terminal group must not adversely affect the positive and advantageous properties of the copolyester-carbonate. Thus, while some compounds may be effective chain terminators they may not be practical since they have an adverse effect upon the advantageous mechanical and physical properties of the copolyester-carbonate resins.

It is an object of the instant invention to provide novel amide and carbamate chain terminated copolyester-carbonates exhibiting improved thermal stabilities.

SUMMARY OF THE INVENTION

In accordance with the instant invention there are provided copolyester-carbonates containing amide terminal groups and carbamate terminal groups.

DESCRIPTION OF THE INVENTION

The instant invention is directed to novel high molecular weight aromatic copolyester-carbonates having as terminal or end groups amide groups and carbamate groups. The presence of these amide groups and carbamate groups results in copolyester-carbonates exhibiting controlled molecular weights and improved thermal stability.

The copolyester-carbonate resins of the instant invention are known compounds which are disclosed, inter alia, in U.S. Pat. No. 3,169,121, which is incorporated herein by reference.

Briefly stated, the high molecular weight aromatic copolyester-carbonates comprise recurring carbonate groups

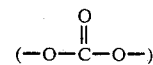

carboxylate groups

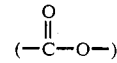

and aromatic carboxylic groups in the linear polymer chain, in which at least some of the carboxylate groups and at least some of the carbonate groups are bonded to the ring carbon atoms of the aromatic carbocyclic groups.

These copolyester-carbonates contain ester bonds and carbonate bonds in the polymer chain wherein the amount of ester bonds, relative to the carbonate bonds, is in the range of from about 25 to about 90 mole percent, preferably from about 35 to about 80 mole percent. For example, 5 moles of bisphenol-A reacting completely with 4 moles of isophthaloyl dichloride and one mole of phosgene would give a copolyester-carbonate of 80 mole percent ester bonds.

The copolyester-carbonate resins of the instant invention are derived from (i) a carbonate precursor, (ii) at least one difunctional carboxylic acid or a reactive derivative thereof, (iii) at least one dihydric phenol, and (iv) at least one carbamate-amide precursor.

The dihydric phenols employed in the practice of the instant invention are known dihydric phenols. These dihydric phenols may be represented by the general formula

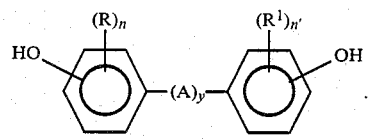

wherein:
R is independently selected from monovalent hydrocarbon radicals, halogen radicals, and monovalent hydrocarbonoxy radicals;
R¹ is independently selected from monovalent hydrocarbon radicals, halogen radicals, and monovalent hydrocarbonoxy radicals;
n and n' are independently selected from positive integers having a value of from 0 to 4 inclusive;
y is either zero or one; and
A is selected from divalent hydrocarbon radicals, —S—, —S—S—, —O—,

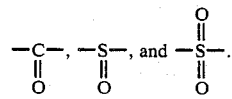

The divalent hydrocarbon radicals represented by A are selected from alkylene radicals, cycloalkylene radicals, alkylidene radicals, and cycloalkylidene radicals. Preferred alkylene radicals are those containing from 2 to about 7 carbon atoms. Preferred cycloalkylene radicals are those containing from 4 to about 7 ring carbon atoms. Preferred alkylidene radicals are those containing from 1 to about 7 carbon atoms. Preferred cycloalkylidene radical are those containing from 4 to about 7 ring carbon atoms.

The monovalent hydrocarbon radicals represented by R and $R^1$ are selected from alkyl radicals, cycloalkyl radicals, aryl radicals, aralkyl radicals, and alkaryl radicals.

Preferred alkyl radicals represented by R and $R^1$ are those containing from 1 to about 8 carbon atoms. Some illustrative non-limiting examples of these preferred alkyl radicals include methyl, ethyl, propyl, isopropyl, butyl, tertiarybutyl, pentyl, neopentyl, and the like.

Preferred cycloalkyl radicals represented by R and $R^1$ are those containing from 4 to about 7 ring carbon atoms. Some illustrative non-limiting examples of these preferred cycloalkyl radicals include cyclobutyl, cyclopentyl, cyclohexyl, methylcyclohexyl, and cycloheptyl.

Preferred aryl radicals represented by R and $R^1$ are those containing from 6 to 12 carbon atoms. These include phenyl, naphthyl and biphenyl.

Preferred aralkyl and alkaryl radicals represented by R and $R^1$ are those containing from 7 to about 12 carbon atoms. Some illustrative non-limiting examples of these aralkyl and alkaryl radicals include ethylphenyl, propylphenyl, benzyl, methylnaphthyl, tolyl, and the like.

The preferred halogen radicals are chlorine and bromine.

The monovalent hydrocarbonoxy radicals represented by R and $R^1$ may be represented by the general formula —$OR^2$, wherein $R^2$ represents a monovalent hydrocarbon of the type described hereinafore.

In the dihydric phenol compounds of Formula I when y is zero the aromatic nuclear residues are directly joined with no intevening alkylene or other bridge. When more than one R substituent is present they may be the same or different. The same is true for the $R^1$ substituent. The positions of the hydroxyl groups and R or $R^1$ on the aromatic nuclear residue may be varied in the ortho, meta or para positions and the groupings can be in a vicinal, asymmetrical or symmetrical relationship where two or more ring carbon atoms of the aromatic nuclear residue are substituted with R or $R^1$ and hydroxyl groups.

Particularly useful dihydric phenols of Formula I are those wherein n and n' are both zero, or where both R and $R^1$ are selected from monovalent hydrocarbon radicals, with the alkyl radicals being the preferred monovalent hydrocarbon radicals.

Some illustrative non-limiting examples of dihydric phenols of Formula I include:

2,2-bis(4-hydroxyphenyl)propane(bisphenol-A);
1,3-bis(3-methyl-4-hydroxyphenyl)propane;
2,2-bis(4-hydroxyphenyl)butane;
2,2-bis(3-phenyl-4-hydroxyphenyl)propane;
1,1-bis(4-hydroxyphenyl)cyclohexane;
2,2-bis(3,5-dimethyl-4-hydroxyphenyl)propane;
4,4'-dihydroxydiphenyl;
4,4'-thiodiphenol;
2,2-bis(3-bromo-4-hydroxyphenyl)propane;
2,2-bis(3,5-dibromo-4-hydroxyphenyl)propane; and
bis(4-hydroxyphenyl)ether.

It is, of course, possible to utilize mixtures of two or more different dihydric phenols, as well as individual phenols. Therefore, wherever the term dihydric phenol is used herein it is meant to include mixtures of two or more different dihydric phenols as well as individual dihydric phenols.

In general, any difunctional carboxylic acid conventionally used in the preparation of linear polyesters may be utilized in the preparation of the copolyester-carbonates of the instant invention. Generally, the carboxylic acids which may be utilized include the aliphatic carboxylic acids, the aromatic carboxylic acids, and the aliphatic-aromatic carboxylic acids. These acids are disclosed, inter-alia, in U.S. Pat. No. 3,169,121, which is hereby incorporated herein by reference.

The difunctional carboxylic acid which may be used generally will conform to the general formula

$$R^3-(R^4)_q-COOH \quad (II)$$

wherein $R^4$ is an alkylene, alkylidene, or cycloalkylene or cycloalkylidene group; an alkylene, alkylidene, cycloalkylene or cycloalkylidene group containing ethylenic unsaturation; an aromatic group such as phenylene, biphenylene, substituted phenylene, naphthylene, and the like; two or more aromatic groups connected through non-aromatic linkages such as alkylene or alkylidene groups; and a divalent aralkyl radical such as tolylene, xylylene, and the like. $R^3$ is either a carboxyl or a hydroxyl group. The letter q represents one where $R^3$ is a hydroxyl group and either zero or one where $R^3$ is a carboxyl group.

Preferred difunctional carboxylic acids are the aromatic dicarboxylic acids. Particularly useful aromatic difunctional carboxylic acids are those represented by the general formula

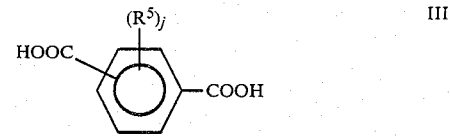

wherein j is a positive integer having a value of from 0 to 4 inclusive; and $R^5$ is independently selected from alkyl radicals, preferably lower alkyl radicals containing from 1 to about 5 carbon atoms.

Mixtures of these difunctional carboxylic acids as well as individual difunctional carboxylic acids may be employed.

Preferred aromatic dicarboxylic acids are isophthalic acid, terephthalic acid, and mixtures thereof. A particularly useful carboxylic acid comprises a mixture of isophthalic acid and terephthalic acid wherein the weight ratio of terephthalic acid to isophthalic acid is in the range of from about 9:1 to about 0.2:9.8.

Rather than utilizing the difunctional carboxylic acids per se it is possible, and sometimes even preferred, to employ the ester forming reactive derivatives of these acids. Illustrative of these ester forming reactive derivatives are the acid halides. The preferred acid halides are the acid chlorides. Thus, for example, instead of using isophthalic acid, terephthalic acid, or mixtures thereof it is possible to employ isophthaloyl dichloride, terephthaloyl dichloride, or mixtures thereof.

The carbamate-amide precursors are compounds that form carbamate groups with the carbonate terminal portions of the copolyester-carbonates and amide groups with the carboxylate terminal portions of the copolyester-carbonates. The carbamate terminal groups are represented by the general formula

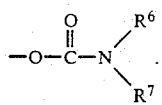   IV wherein $R^6$ and $R^7$ are independently selected from monovalent hydrocarbon radicals and hydrogen.

The amide terminal groups are represented by the general formula

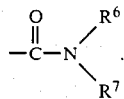   V wherein $R^6$ and $R^7$ are independently selected from monovalent hydrocarbon radicals and hydrogen.

The monovalent hydrocarbon radicals are preferably selected from alkyl radicals, cycloalkyl radicals, aryl radicals, aralkyl radicals, and alkaryl radicals.

The preferred alkyl radicals represented by $R^6$ and $R^7$ are those containing from 1 to about 18 carbon atoms. The preferred alkyl radicals include the straight chain alkyl radicals and the branched alkyl radicals. Some illustrative non-limiting examples of these preferred alkyl radicals include methyl, ethyl, propyl, butyl, tertiarybutyl, pentyl, neopentyl, hexyl, heptyl, octyl, dodecyl, 3-ethyldecyl, and 2,4-dimethyldecyl.

The preferred cycloalkyl radicals are those containing from 4 to about 7 ring carbon atoms. Some illustrative non-limiting examples of these preferred cycloalkyl radicals include cyclobutyl, cyclopentyl, cyclohexyl, methylcyclohexyl, and and cycloheptyl.

The preferred aryl radicals represented by $R^6$ and $R^7$ are those containing from 6 to 12 carbon atoms. These include phenyl, biphenyl, and naphthyl.

The preferred aralkyl and alkaryl radicals represented by $R^6$ and $R^7$ are those containing from 7 to about 14 carbon atoms. Some illustrative non-limiting examples of these radicals include ethylphenyl, benzyl, tolyl, and xylyl.

The compounds that form the carbamate and amide terminal groups of Formulae IV and V respectively include ammonia, ammonium compounds that liberate ammonia under the copolyester-carbonate forming conditions, primary amines, secondary amines, and ammonium salts of primary and secondary amines which liberate said primary and secondary amines under the copolyester-carbonate forming conditions.

The primary amines include the aliphatic and the aromatic primary amines. Such illustrative non-limiting examples of these primary amines include ethyl amine, methyl amine, cyclohexyl amine, aniline, benzyl amine, n-butyl amine, isobutyl amine, tertiarybutyl amine, pentyl amine, and neopentyl amine.

The secondary amines include the aliphatic secondary amines, the aromatic secondary amines, and the aliphatic-aromatic secondary amines. Such illustrative non-limiting examples of these secondary amines include ethyl methyl amine, diethyl amine, dicyclohexyl amine, methyl cyclohexyl amine, ethyl phenyl amine, dibenzyl amine, ethyl benzyl amine, cyclohexyl phenyl amine, dibutyl amine, and ditertiarybutyl amine.

Suitable examples of ammonium compounds that liberate ammonia under the reaction conditions existent during the formation of the copolyester-carbonate polymers include, but are not limited to, ammonium hydroxide, ammonium carbonate, ammnoium sulfite, ammonium phosphate, ammonium sulfite, and ammonium chloride.

Suitable examples of ammonium salts of primary and secondary amines which liberate primary and secondary amines under the copolyester-carbonate forming reaction conditions include, but are not limited to, methylamine hydrochloride, isopropylamine hydrochloride, cyclohexylamine hydrogen sulfate,, dimethylamine hydrochloride, tertiarybutyl cyclohexylamine hydrobromide, and phenyl methylamine hydrochloride.

The carbamate-amide precursors function as end-capping or chain terminating agents serving to control or regulate the molecular weight of the copolyester-carbonate polymers in the process of the instant invention. The carbamate-amide precursors form terminal carbamate and amide groups on the ends of the polymer chain. More particularly, the carbamate-amide precursors form carbamate groups on the ends of the polymer containing haloformate moieties and amide groups on the ends of the polymer containing carboxylic acid halide moieties. The carbamate-amide precursors are added during the reaction process of the copolyester-carbonate formation so that their presence can influence the chain length of the polymer and, therefore, the molecular weight of the copolyester-carbonate.

The weight average molecular weight of the copolyester-carbonate polymers is generally controlled, by the use of the carbamate-amide precursors, in the range of from about 10,000 to about 150,000, preferably from about 20,000 to about 100,000, and more preferably from about 30,000 to about 70,000. The molecular weight of the copolyester-carbonates is generally dependent upon the amount of the carbamate-amide precursor employed. Generally, the larger the amount of the carbamate-amide precursor present the lower the molecular weight. Conversely, the smaller the amount of the carbamate-amide precursor used the higher the molecular weight of the copolyester-carbonate resin.

The amount of the carbamate-amide precursors employed is a chain terminating amount. By chain terminating amount is meant an amount effective to terminate the chain length of the copolyester-carbonate polymer before its molecular weight becomes too high and, consequently, the copolyester-carbonate polymer becomes too viscous for any practical application, but insufficient to terminate the polymer chain before a copolyester-carbonate of useful molecular weight is formed. Generally, this amount ranges from about 0.1 to about 10 mole percent based on the total amounts of dihydric phenol and difunctional carboxylic acid or its ester forming reactive derivative present, and preferably from about 1 to about 7 mole percent.

In carrying out the present invention only one carbamate-amide precursor may be used. In this case all of the end or terminal groups of the polymers will be the same carbamate groups and the same amide groups. Alternatively, a mixture of two or more different precursors may be employed. In this instance a statistical mixture of carbamate and amide terminated copolyester-carbonate polymers will ensue. The amounts of the different carbamate-amide precursors, and their relative reactivities, will be determinative of the relative amounts of the different amide and carbamate groups present.

Additionally, the carbamate-amide precursors may be used in conjunction with conventional chain terminating or end-capping agents such as phenol, tertiarybutyl phenol, and Chroman-I. In such case a statistical mixture of polymers containing different terminal groups, e.g., carbamate groups, amide groups, and terminal groups obtained from the conventional chain terminating agents, will be obtained. The relative amounts of the various terminal groups present will depend on the amounts and relative reactivities of the various chain terminating agents used.

The copolyester-carbonates of the instant invention may be prepared by conventional processes such as interfacial polymerization, transesterification, melt polymerization, and the like. Various of these conventional processes are disclosed in U.S. Pat. Nos. 3,030,331, 3,169,121 and 3,027,814, all of which are incorporated herein by reference. Although the processes may vary, several preferred processes typically involve dissolving or dispersing the reactants in a suitable water immiscible solvent medium and contacting the reactants with a carbonate precursor, such as phosgene, in the presence of a suitable catalyst, the carbamate-amide precursor, and an aqueous caustic solution under controlled pH conditions.

A particularly useful method for preparing the copolyester-carbonates of the instant invention is the interfacial polymerization technique. A particularly useful interfacial polymerization technique for preparing the copolyester-carbonate resins of the instant invention, when employing phosgene as the carbonate precursor, involves first introducing the diacid halides dissolved in a suitable organic solvent into a reaction mixture containing a dihydric phenol and a catalyst. Upon completion of the introduction of the diacid halides phosgene is introduced into the reaction mixture in sufficient quantity to bring about reaction of substantially all of the remaining aromatic hydroxy groups. The carbamate-amide precursor may be present in the reaction mixture before introduction of the diacid halides has begun, it may be added to the reaction mixture after the diacid halides have been added, or addition of the diacid halides and the carbamate-amide precursor into the reaction mixture may take place simultaneously with the addition of the diacid halides.

The carbonate precursor which is utilized in the formation of the instant copolyester-carbonate resins may be a carbonyl halide, a diarylcarbonate, or a bishaloformate. The carbonyl halide carbonate precursors include carbonyl bromide, carbonyl chloride, and mixtures thereof. The bishaloformate carbonate precursors include, but are not limited to, the bishaloformates of dihydric phenols such as bischloroformates of 2,2-bis(4-hydroxyphenyl)propane, hydroquinone, and the like; the bishaloformates of glycols such as the bischloroformates of ethylene glycol, neopentyl glycol, polyethylene glycol, and the like. Typical of the diarylcarbonates which may be employed as the carbonate precursors are diphenyl carbonate, the bis(haloaryl)carbonates, and the di(alkylphenyl)carbonates such as di(tolyl)carbonate. Some other non-limiting illustrative examples of suitable diarylcarbonates which may be used as the carbonate precursors include di(naphthyl)carbonate and phenyl tolyl carbonate.

The preferred carbonate precursors are the carbonyl halides, with carbonyl chloride, also known as phosgene, being the preferred carbonyl halide.

The catalysts which can be employed, if an interfacial polymerization technique is used, accelerate the rate of polymerization of the dihydric phenol with the ester precursor such as the difunctional carboxylic acid or its reactive derivative and with the carbonate precursor. Suitable catalysts include but are not limited to tertiary amines such as triethylamine, quaternary ammonium compounds, and quaternary phosphonium compounds.

Also included with the scope of the instant invention are the randomly branched copolyester-carbonate resins wherein a minor amount (typically between about 0.05 to about 2 mole percent, based on the quantity of dihydric phenol employed) of a polyfunctional aromatic compound is a co-reactant with the dihydric phenol in the reaction mixture to provide a thermoplastic randomly branched copolyester-carbonate resin. These polyfunctional aromatic compounds contain at least three functional groups which may be hydroxyl, carboxyl, carboxylic anhydride, haloformyl, or mixtures thereof. Some illustrative non-limiting examples of these polyfunctional compounds include trimellitic anhydride, trimellitic acid, trimellityl trichloride, 4-chloroformyl-phthalic anhydride, pyromellitic acid, pyromellitic dianhydride, mellitic acid, mellitic anhydride, trimesic acid, benzophenonetetracarboxylic acid, and benzophenonetetracarboxylic acid anhydride. Other organic polyfunctional compounds useful in making the branched copolyester-carbonate resins are disclosed in U.S. Pat. Nos. 3,635,895 and 4,001,184, both of which are incorporated herein by reference.

As mentioned hereinafore the chain terminating compounds utilized in the instant invention may be comprised of a mixture of at least one carbamate-amide precursor of the instant invention and at least one conventional chain terminating agent such as phenol, tertiarybutyl phenol, and the like. These conventional chain terminating agents include, but are not limited to, phenol itself, paratertiarybutyl phenol, and Chroman-I. When a mixture of the carbamate-amide precursor and a conventional chain terminating agent is used, this mixture generally contains from about 25 to about 75 mole percent of at least one carbamate-amide precursor and from about 75 to about 25 mole percent of at least one conventional chain terminating agents, based on the total amounts of carbamate-amide precursors and conventional chain terminating agents present.

The copolyester-carbonates of the instant invention may optionally have admixed therewith various commonly known and used additives. These additives include, but are not limited to, antioxidants; antistatic agents; inert fillers such as clay, mica, talc, and glass; ultraviolet radiation absorbers such as the benzophenones and the benzotriazoles; hydrolytic stabilizers such as the epoxides disclosed in U.S. Pat. Nos. 3,489,716, 4,138,379 and 3,839,247, all of which are incorporated herein by reference; color stabilizers such as the organophosphites disclosed in U.S. Pat. Nos. 3,305,520, 4,118,370 and 4,138,379, all of which are incorporated herein by reference; and flame retardants.

Some particularly useful flame retardants are the alkali and alkaline earth metal salts of sulfonic acids. These types of flame are disclosed in U.S. Pat. Nos. 3,933,734, 3,931,100, 3,974,024, 3,948,851, 3,926,908, 3,919,167, 3,909,490, 3,953,396, 3,953,399, 3,917,559 and 3,940,366, all of which are incorporated herein by reference.

The copolyester-carbonates of the instant invention are useful in making molded articles, film, sheets, and the like.

DESCRIPTION OF THE PREFERRED EMBODIMENT

The following examples are set forth to further illustrate the present invention, and are not to be construed as limiting the invention thereto. These examples are set forth by way of illustration and not limitation. Unless otherwise specified all parts and percentages are parts and percentages by weight.

The following example illustrates a copolyester-carbonate resin chain terminated with a conventional prior art phenol chain terminating agent. This example falls outside the scope of the instant invention and is presented for comparative purposes only.

EXAMPLE 1

This example illustrates a conventional prior art copolyester-carbonate derived from isophthaloyl dichloride, bisphenol-A, phosgene, and chain terminated with a phenol chain terminating agent.

To a reaction vessel there are added 2280 grams (10 moles) of bisphenol-A, 14 milliliters of triethylamine, 7 liters of methylene chloride, and 6 liters of water. A 25% aqueous solution of sodium hydroxide is added to adjust the pH of the reaction mixture to about 11 and thereafter to maintain it at a pH of about 11. Isophthaloyl dichloride, 406 grams (2.0 moles) dissolved in 500 milliliters of methylene chloride, is added to the reaction mixture over a period of 10 minutes while maintaining the pH at about 11 with the use of an automatic titrator. After the pH becomes stable without the use of any additional caustic solution 30.1 grams (3.2 mole %) of phenol chainstopper is added and phosgene is introduced into the reaction mixture at the rate of 36 grams per minute for 26 minutes while maintaining the pH at about 11 by the addition of the aqueous caustic solution. The amount of phosgene added is 936 grams (9.46 moles). The methylene chloride layer is separated from the alkaline aqueous layer, washed with 0.01N aqueous hydrochloric acid, and then washed twice with deionized water. The copolyester-carbonate resin is precipitated with steam and dried in a vacuum oven at 60° C. The resultant copolyester-carbonate resin is fed to an extruder, which extruder is operated at about 550° F., and the extrudate is comminuted into pellets. The pellets are then injection molded at about 600° F. into test bars of about 5 in. by ½ in. by ⅛ in. thick and into test bars about 5 in. by ½ in. by about 1/16 in. thick. The ⅛ in. thick and the 1/16 in. thick test bars (5 for each test result shown in Table I) are subjected to the flame retardancy test procedure set forth in Underwriters' Laboratories, Inc. Bulletin UL-94, Burning Test for Classifying Materials. In accordance with this test procedure, materials that pass the test are rated either V-O, V-I or V-II based on the results of 5 specimens. The criteria for each V (for vertical) rating per UL-94 is briefly as follows:

"V-O": Average flaming and/or glowing after removal of the igniting flame shall not exceed 5 seconds and none of the specimens shall drip flaming particles which ignite absorbent cotton.

"V-I": Average flaming and/or glowing after removal of the igniting flame shall not exceed 25 seconds and the glowing does not travel vertically for more than ⅛" of the specimen after flaming ceases and glowing is incapable of igniting absorbent cotton.

"V-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the invention, as "burns". Further, UL-94 requires that all test bars in each test group must meet the V-type rating to achieve the particular classification; otherwise, the 5 bars receive the rating of the worst single bar. For example, if one bar is classified as V-II and the other four bars as classified as V-O, then the rating of all bars is V-II.

Impact measurements by the Notched Izod test method are determined pursuant to ASTM D-256 on ⅛ inch thick test bars.

The glass transition temperatures (Tg) of the instant copolyester-carbonates are determined by using a Perkins-Elmer DSC-2B instrument which measures the second order glass transition temperature, Tg, by differential scanning calorimetry.

The heat distortion temperature under load (DTUL) of test samples 2½ in. by ½ in. by ⅛ in. is determined according to modified ASTM D-648.

Also determined is the % light transmission and the % haze.

The results of these test procedures are set forth in Table I.

The following examples illustrate the copolyester-carbonates of the instant invention.

EXAMPLE 2

The procedure of Example 1 is substantially repeated with the exception that the 30.1 grams of phenol chainstopper are replaced with 11.2 grams (3.6 mole %) of methylamine dissolved in water.

EXAMPLE 3

The procedure of Example 1 is substantially repeated with the exception that the 30.1 grams of phenol chainstopper are replaced with a mixture of 15.1 grams (1.6 mole %) of phenol and 5.6 grams (1.8 mole %) of methylamine, as a 40% aqueous solution.

TABLE I

|  | Example No. 1 | Example No. 2 | Example No. 3 |
|---|---|---|---|
| Tg (°C.) | 154 | 159 | 157 |
| DTUL (°C.) | 142.4 | 142.6 | 142 |
| NI (ft. lb.) | 15.2 | 16.2 | 16.6 |
| NI, % ductility | 100 | 100 | 100 |
| % Haze | 1.7 | 1.2 | 1.4 |
| % Light transmission | 87.3 | 88 | 88.1 |
| UL-94 (⅛" thick) | burns | V-II | V-II |
| UL-84 (1/16" thick) | V-II | V-II | V-II |

As illustrated by the data in Table I the copolyester-carbonates of the instant invention exhibit, to a substantial degree, most of the advantageous properties of conventional prior art copolyester-carbonates. The instant copolyester-carbonates also exhibit, as indicated by their higher glass transition temperatures and improved flame retardancy, improved thermal characteristics as compared with conventional prior art copolyester-carbonates.

Obviously, other modifications and variations of the present invention are possible in light of the above teachings. It is, therefore, to be understood that changes may be made in the particular embodiments of the invention described which are within the full intended scope of the invention defined by the appended claims.

What is claimed is:

1. Aromatic copolyester-carbonate resins having from about 25 to about 90 mole percent ester bonds containing at least one terminal group selected from aliphatic carbamate terminal groups and aliphatic amide terminal groups, said aliphatic carbamate terminal groups being represented by the general formula

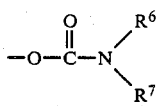

and said aliphatic amide terminal groups being represented by the general formula

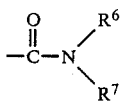

wherein $R^6$ and $R^7$ are independently selected from hydrogen, alkyl radicals, and cycloalkyl radicals.

2. The resins of claim 1 which contain an amide terminal group and a carbamate terminal group.

3. The resins of claim 1 wherein both $R^6$ and $R^7$ are hydrogen.

4. The resins of claim 1 wherein at least one of $R^6$ and $R^7$ is hydrogen.

5. The resins of claim 1 wherein at least one of $R^6$ and $R^7$ is an alkyl radical.

6. The resins of claim 5 wherein both $R^6$ and $R^7$ are independently selected from alkyl radicals.

7. The resins of claim 1 which are prepared by reacting (i) a carbonate precursor, (ii) at least one difunctional carboxylic acid or an ester forming reactive derivative thereof, (iii) at least one dihydric phenol, and (iv) a chain terminating amount of at least one aliphatic carbamate-amide precursor.

8. The resins of claim 7 wherein said carbamate-amide precursor is selected from ammonia, ammonium compounds, primary aliphatic amines, secondary aliphatic amines, hydrogen ammonium salts of primary aliphatic amines, and hydrogen ammonium salts of secondary aliphatic amines.

9. The resins of claim 8 wherein said carbamate-amide precursor is selected from primary aliphatic amines and secondary aliphatic amines.

10. The resins of claim 8 wherein said carbonate precursor is phosgene.

11. The resins of claim 10 wherein said ester forming reactive derivative of said difunctional carboxylic acid is selected from isophthaloyl dichloride, terephthaloyl dichloride, and mixtures thereof.

12. The resins of claim 11 wherein said dihydric phenol is bisphenol-A.

* * * * *